(12) United States Patent
Lindén et al.

(10) Patent No.: US 10,450,025 B2
(45) Date of Patent: Oct. 22, 2019

(54) LUGGAGE CARRIER

(71) Applicant: AtranVelo AB, Falkenberg (SE)

(72) Inventors: Krister Lindén, Falkenberg (SE);
Roger Pettersson, Falkenberg (SE); Ulf Pentéus, Falkenberg (SE)

(73) Assignee: AtranVelo AB, Falkenberg (SE)

( * ) Notice: Subject to any disclaimer, the term of this patent is extended or adjusted under 35 U.S.C. 154(b) by 0 days.

(21) Appl. No.: 15/584,862

(22) Filed: May 2, 2017

(65) Prior Publication Data

US 2017/0320530 A1  Nov. 9, 2017

(30) Foreign Application Priority Data

May 3, 2016  (EP) .................................... 16168151

(51) Int. Cl.
*B62J 7/00* (2006.01)
*B62J 7/08* (2006.01)
*B62J 7/02* (2006.01)
*B62J 1/00* (2006.01)

(52) U.S. Cl.
CPC . *B62J 7/08* (2013.01); *B62J 7/02* (2013.01); *B62J 1/00* (2013.01)

(58) Field of Classification Search
CPC ............. B62J 7/08; B62J 7/02; B62J 2700/00
USPC ........................................................ 224/419
See application file for complete search history.

(56) References Cited

U.S. PATENT DOCUMENTS

| | | | | |
|---|---|---|---|---|
| 605,188 | A * | 6/1898 | Rondell | B62J 7/04 224/444 |
| 2,675,151 | A * | 4/1954 | Herbert | B62J 9/00 220/6 |
| 3,087,661 | A * | 4/1963 | Glenny | B62J 9/00 224/429 |
| 3,301,448 | A * | 1/1967 | Inoue | B62J 7/08 224/417 |
| 4,053,091 | A * | 10/1977 | Martelet | B62J 1/16 224/415 |
| 4,154,382 | A * | 5/1979 | Blackburn | B62J 7/04 224/445 |
| 4,282,993 | A | 8/1981 | Humlong | |
| 4,331,270 | A | 5/1982 | Humlong | |
| 4,364,497 | A * | 12/1982 | Zimmerli | B62J 7/08 224/430 |
| 6,607,327 | B1 | 8/2003 | Ho | |

(Continued)

FOREIGN PATENT DOCUMENTS

CN  2532000 Y  1/2003
CN  103552629 A  2/2014

(Continued)

OTHER PUBLICATIONS

Extended European Search Report for Application No. EP16168151.5, dated Oct. 25, 2016.

*Primary Examiner* — Peter N Helvey

(74) *Attorney, Agent, or Firm* — Sandberg Phoenix & von Gontard PC

(57) ABSTRACT

There is provided an adapter for attaching an object to a luggage carrier. The adapter comprises a hook shaped portion engageable with a first attachment member of the luggage carrier, a latch configured to engage with a second attachment member of the luggage carrier and a release portion configured to release the latch from the second attachment member.

18 Claims, 6 Drawing Sheets

(56) References Cited

U.S. PATENT DOCUMENTS

| | | | |
|---|---|---|---|
| 6,843,396 B2 * | 1/2005 | Champagne | B62J 7/04 224/422 |
| 7,392,992 B2 * | 7/2008 | Stone | B62B 1/125 224/411 |
| 8,857,686 B1 | 10/2014 | Vitanza | |
| 2006/0138185 A1 * | 6/2006 | Lien | B62J 7/00 224/427 |
| 2010/0327034 A1 * | 12/2010 | Hajiani | B62J 7/04 224/441 |
| 2011/0272371 A1 * | 11/2011 | Pettifer | B60R 7/02 211/85.15 |

FOREIGN PATENT DOCUMENTS

| | | |
|---|---|---|
| DE | 29921906 U1 | 3/2000 |
| DE | 102008044797 A1 | 3/2009 |
| DE | 20 2013 101 143 U1 | 5/2013 |
| DE | 10 2005 008 815 B4 | 7/2013 |
| DE | 10 2005 044 132 C5 | 8/2013 |
| DE | 10 2013 022 127 A1 | 5/2015 |
| EP | 2 865 587 A1 | 4/2015 |
| GB | 2421758 A | 5/2006 |
| NL | 8201395 A1 | 11/1982 |
| TW | 201515914 A | 5/2015 |
| WO | 9733786 A1 | 9/1997 |

* cited by examiner

LUGGAGE CARRIER

CROSS-REFERENCE TO RELATED APPLICATIONS

This application claims priority to European Patent App. No. 16168151.5 filed on May 3, 2016, and which is incorporated herein by reference.

TECHNICAL FIELD

The present invention relates to a luggage carrier for a bicycle and an adapter configured to engage with the carrier.

BACKGROUND

Luggage carriers or racks for bicycles mounted over the front or rear wheel of the bike are well known. The traditional model comprises a number of horizontal bars provided above a wheel, with struts extending to the center of either the back or the front wheel, and to some part of the frame of the bicycle. On the horizontal bars at least one spring loaded clamp device is provided, such that items can be clamped to the luggage carrier.

More advanced luggage carriers are also known, where, in addition to, or instead of, the spring loaded clamping devices, it is possible to attach an adapter to the carrier. The adapter may in turn be attached to, for example, a bag or a basket. In that way the bag/basket can be securely attached to the bicycle.

One example of a bicycle carrier system is disclosed in DE102008044797B4. This system comprises a rectangular attachment device configured to be attached to a bicycle carrier by pegs protruding from its four corners. The attachment device is positioned on the carrier rack and moved horizontally, such that the protruding pegs are received by matching slots provided in the carrier. This device may be complicated to attach to the carrier since the pegs are not visible underneath the basket. It may be hard to match all four pegs to the slots, respectively. Therefore, it is understood that there is room for improvements.

SUMMARY

A luggage carrier with an associated adapter is disclosed which is improved over prior art and which eliminates or at least mitigates the drawbacks discussed above. More specifically, the luggage carrier has an adapter which is easy to maneuver when it is attached or removed to/from the luggage carrier, at the same time as it is securely attached. These objects are achieved by the technique set forth in the appended independent claims with preferred embodiments defined in the dependent claims related thereto.

In a first aspect, there is provided an adapter for attaching an object to a luggage carrier comprising a first attachment member and a second attachment member. The adapter comprises a hook shaped portion configured to engage with the first attachment member of the luggage carrier, a latch configured to engage with the second attachment member of the luggage carrier, and a release portion configured to release the latch from the second attachment member. This adapter is favorable in that it is easily maneuvered when it is attached to the luggage carrier. It is also easily detachable from the luggage carrier.

In one embodiment, the hook shaped portion is provided in a first end portion of the adapter and the latch is provided in a second, opposite end portion of the adapter. This arrangement of the hook portion and the latch provides the adapter with stability when it is attached to the luggage rack, by an even distribution of the connection means.

In another embodiment, the adapter further comprises at least one counter-hold configured to secure the adapter to the luggage carrier by interacting with the latch. This arrangement provides for additional stability of the adapter-rack-connection. The adapter cannot move along the luggage rack due to the counter-hold.

Preferably, the adapter further comprises a surface which is directed in the opposite direction of the counter-hold and which is configured as an opposite directed counter-hold. To have two counter-holds, directed in one direction each, opposite one another provides for additional stability and robustness.

The distance between the first end portion and second end portion may be adapted to correspond to the distance between the first attachment member and the second attachment member, such that the first and second end portions may fit between the first and second attachment member.

The latch may be spring loaded. This provides for easy maneuvering of the adapter.

In a second aspect, there is provided a luggage carrier for a bicycle. The luggage carrier comprises a frame, a number of struts for attachment to the bicycle, a first attachment member and a second attachment member. The attachment members are configured for attachment of an adapter. This is a favorable luggage carrier in that an object attached to the adapter may be attached to it easily and secure.

Preferably, at least one of the attachment members has a shape corresponding to the shape of the hook-shaped portion of the adapter. The attachment between the adapter and the luggage rack becomes stronger if both parts have shapes that correspond to each other, in order to obtain a connection that does not shift or slide.

In a third aspect, there is provided a bicycle comprising a luggage carrier. This bicycle is favorable in that it is easy to attach an object to it, by means of the advantageous luggage rack.

In a fourth aspect, there is provided a method for installing an adapter for attaching an object to a luggage carrier comprising a first attachment member and a second attachment member. The adapter comprises a hook shaped portion, a latch, and a release portion. The method comprises the steps of inserting the hook shaped portion below at least a part of the first attachment member, pivoting an opposite portion of the adapter downwards around a center of rotation comprising the hook shaped portion and the first attachment member, and pushing the adapter further downwards such that the latch engages with the second attachment member. This method is advantageous in that the object equipped with the adapter is easily attached to the luggage carrier. The pivoting movement is facilitated by the force of gravity, such that it is also easy for a user to attach a heavy object to the carrier. If the object is heavy, the gravitational force may be enough for the latch to engage with the second attachment bar, no extra force provided from the user is necessary in this case.

In a fifth aspect, a use of an adapter for attaching a load to a luggage carrier is provided.

In a sixth aspect, a kit for forming a carrier system is provided. The kit comprises a luggage carrier and an adapter which is connectable to the luggage carrier.

In a seventh aspect, a load carrying object is attached to the adapter and is connectable to the luggage carrier. The adapter is attached to the load carrying object by one of the methods: bolting, riveting, sewing, gluing or one piece molding. It is convenient to have the load carrying object, such as a bag, basket or similar, permanently attached to the adapter in order not to lose or forget the adapter. The carrying object is always ready to be connected or attached to the luggage carrier in a convenient manner. The attachment methods are all advantageous for attaching an adapter to an item such as a bag or basket, which may comprise different materials such as hard or soft plastic, fabric, metal, etc.

BRIEF DESCRIPTION OF THE DRAWINGS

Embodiments of the invention will be described in the following; references being made to the appended diagrammatical drawings which illustrate non-limiting examples of how the inventive concept can be reduced into practice.

DETAILED DESCRIPTION

Figure 1:
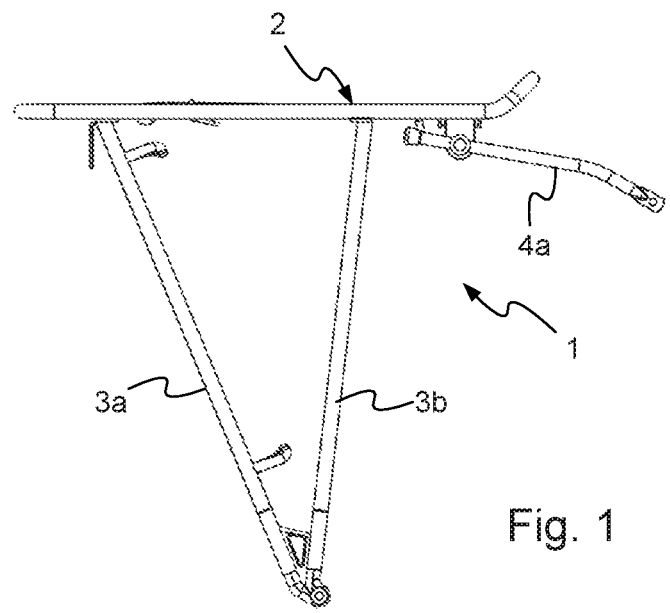
FIG. 1 is a side view of a luggage carrier.
Figure 2:
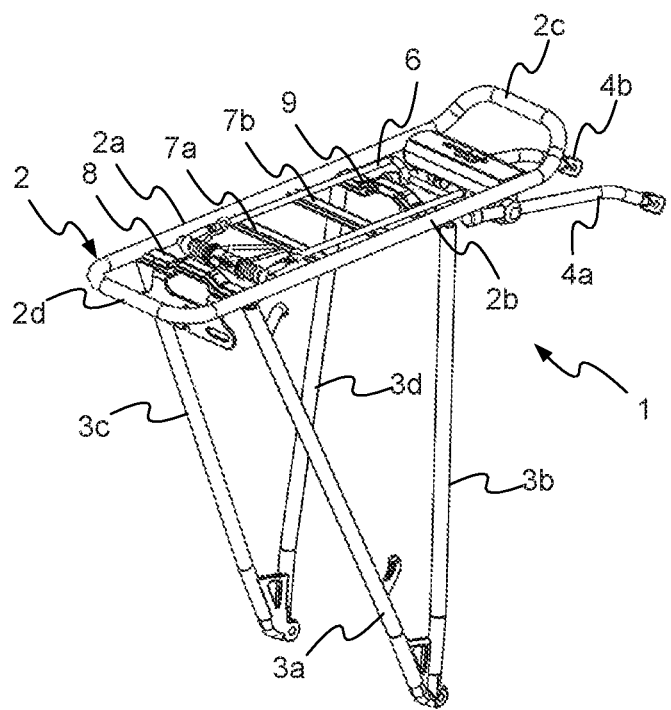
FIG. 2 is an isometric view of the luggage carrier in FIG. 1.
Figure 3:
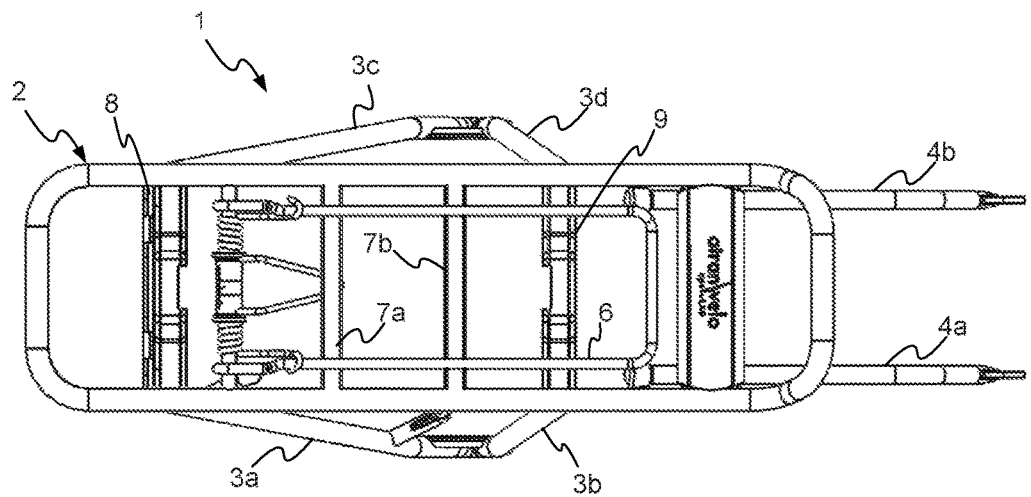
FIG. 3 is a top view of the luggage carrier in FIGS. 1-2.
Figure 4:
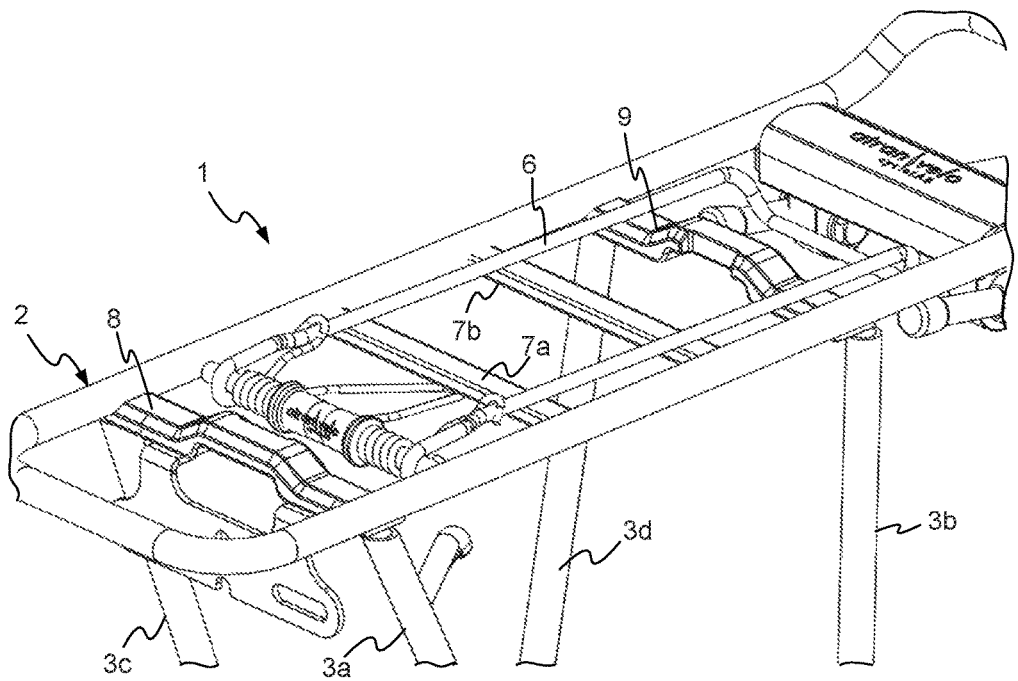
FIG. 4 is an isometric view of a part of the luggage carrier in FIGS. 1-3.
Figure 5:
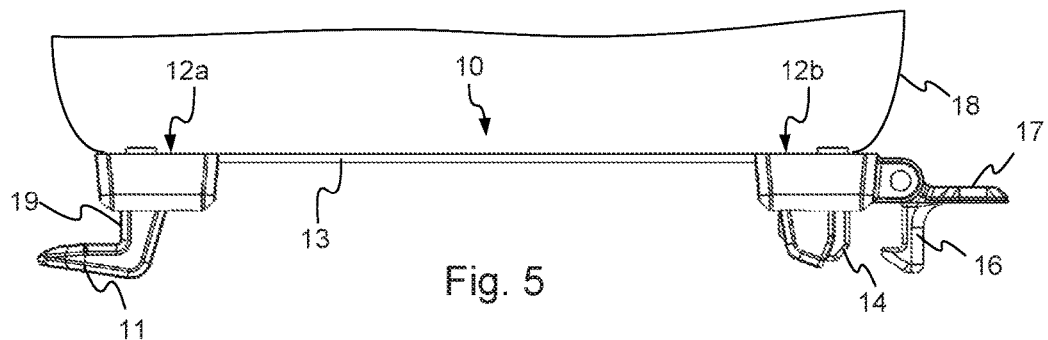
FIG. 5 is a side view of an adapter.
Figure 6:
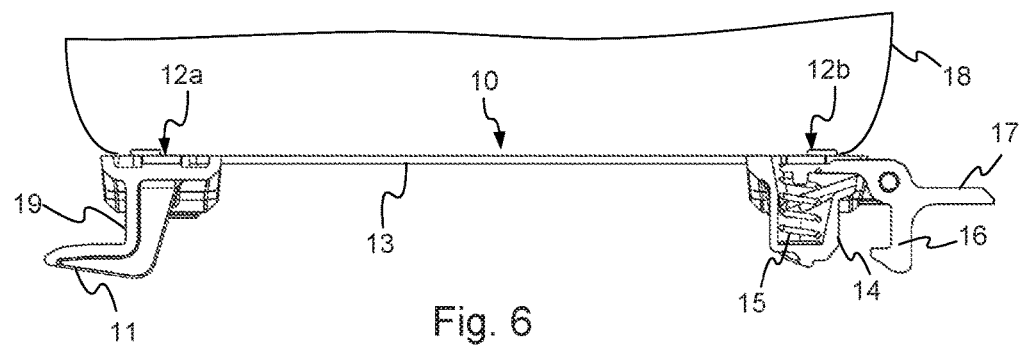
FIG. 6 is a cross section view of the adapter in FIG. 5.
Figure 7:
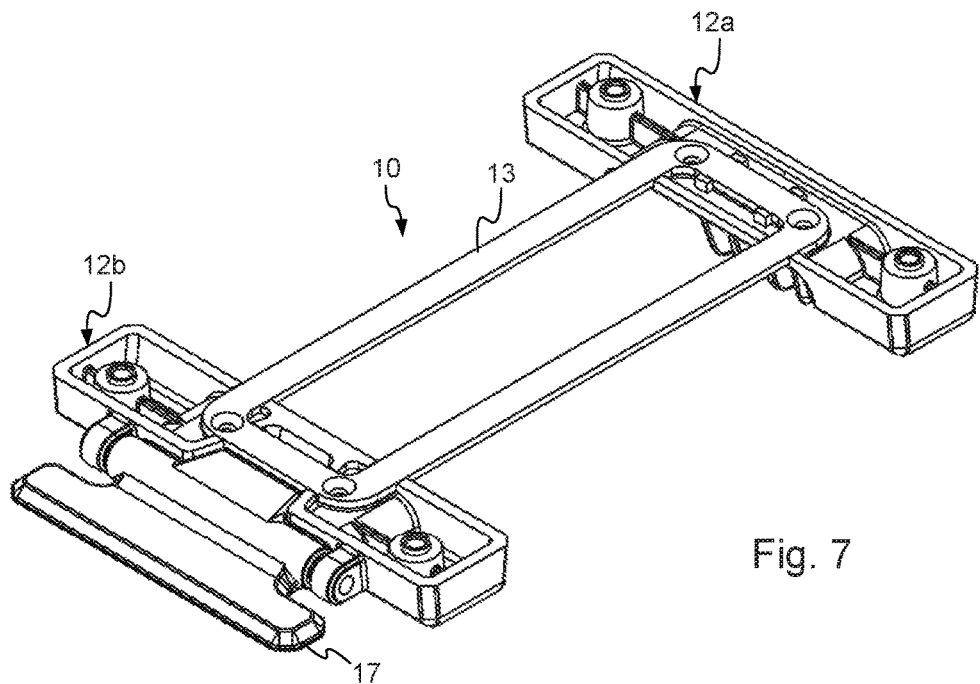
FIG. 7 is an isometric view of the adapter in FIGS. 5-6.
Figure 8:
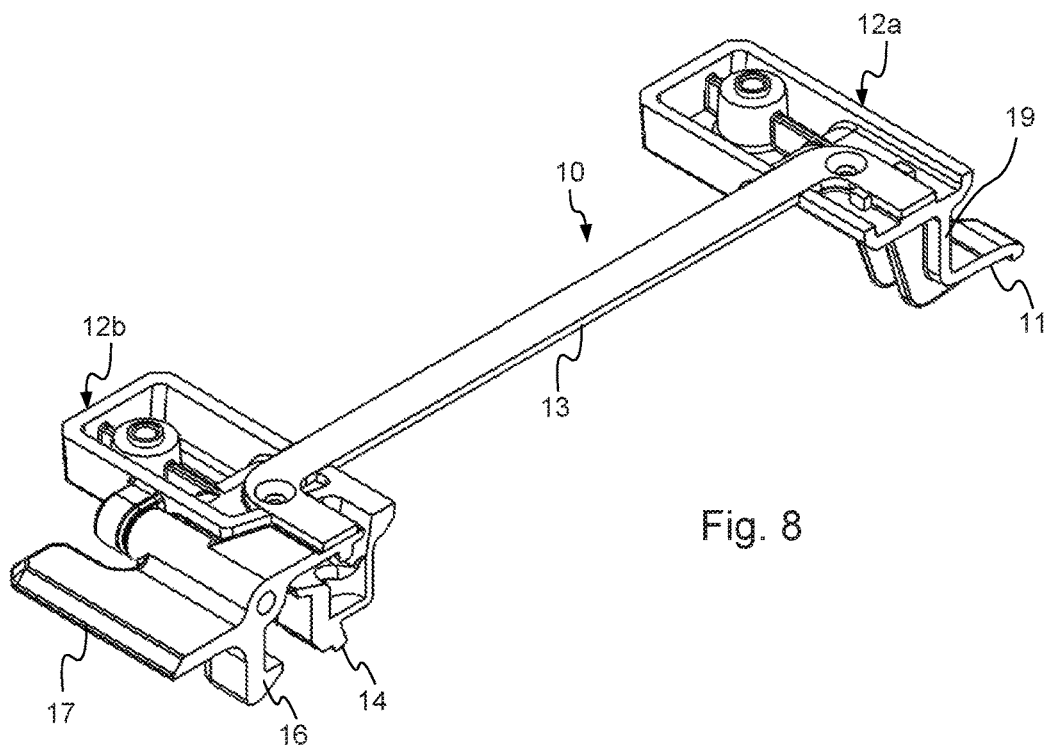
FIG. 8 is an isometric cross section view of the adapter in FIGS. 5-7.

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

In FIGS. 1-4 a luggage carrier 1 for a bicycle (not shown) is shown. The carrier 1 comprises a substantially rectangular frame 2, comprising two long sides 2a, 2b and two short sides 2c, 2d, and which is configured to be provided horizontally on top of a wheel (not shown) of the bicycle. In the frame 2 a spring loaded clamping device 6 is arranged, as well as a number of transverse bars 7a, 7b. Further, a first attachment member 8 is provided in one end of the carrier 1, and a second attachment member 9 is provided in the vicinity of an opposite end of the carrier 1. The attachment members 8, 9 are provided transversally within the frame 2, substantially parallel to the short sides 2c, 2d of the frame 2.

The luggage carrier 1 shown in the figures is configured to be provided in connection with the rear wheel, but in other embodiments it could also be placed above a front wheel (not shown) of a bicycle.

The luggage carrier 1 further comprises four struts 3a, 3b, 3c, 3d extending between the frame 2 and a hub of the wheel. Two of the struts 3a, 3b are placed on a first side of the wheel and the other two struts 3c, 3d are placed on an opposite side of the wheel. Two additional struts 4a, 4b are provided between the frame 2 and a part of a frame of the bicycle. The number of struts and their placement may vary between different embodiments.

In FIGS. 5-8 an adapter 10 is shown. The adapter 10 comprises two parallel portions: a first end portion 12a, and a second end portion 12b. These portions 12a, 12b are in this embodiment interconnected by a rectangular distance guiding means 13. The guiding means 13 ensures that the first end portion 12a and the second end portion 12b end up at a correct, predetermined distance from one another when the adapter 10 is mounted to an object 18, such as a bag, basket or similar object, in order for the adapter 10 to fit between the attachment members 8, 9 of the luggage carrier 1.

In other embodiments, the distance guiding means 13 may comprise one or more distance bars or threads, providing the predetermined distance between the first 12a and second 12b end portion. Alternatively, the guiding means 13 may be omitted, if the user wishes to measure the distance between the first 12a and second 12b end portions him-/herself when attaching the adapter 10 to the object 18.

The first end portion 12a is provided with a hook shaped portion 11 which extends downwards and outwards, as seen from a side view. The hook shaped portion 11 comprises a surface 19, the function of which will be described in more detail later. The second end portion 12b comprises a counter-hold, or abutment, 14, a spring 15, a latch 16, and a release portion 17.

Figure 9:
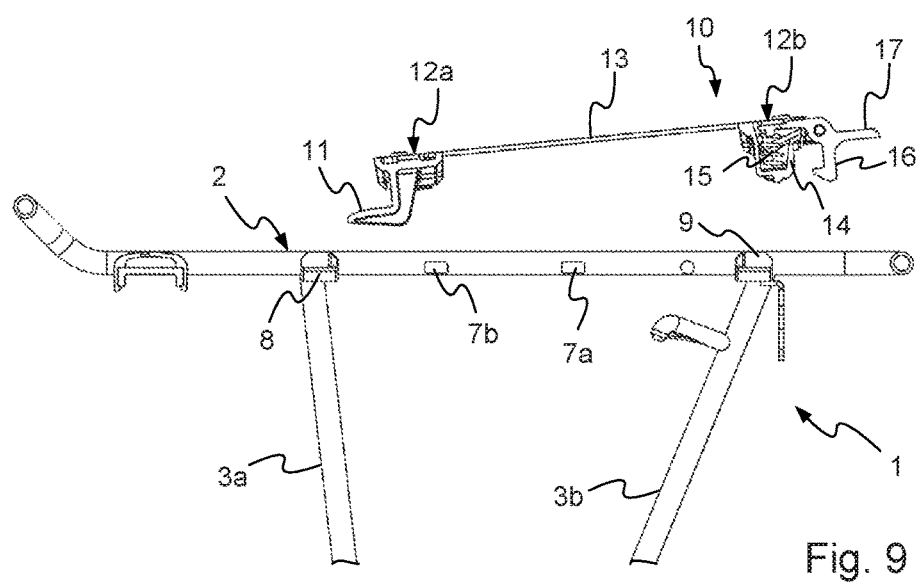
FIGS. 9-13 are a series of side views of the adapter being connected to the luggage carrier.

FIGS. 9-13 show how to connect the adapter 10 to the carrier 1. In FIG. 9 the adapter 10 is brought towards the carrier rack 1, The first end portion 12a of the adapter 10 is directed towards the first attachment member 8.

Figure 10:
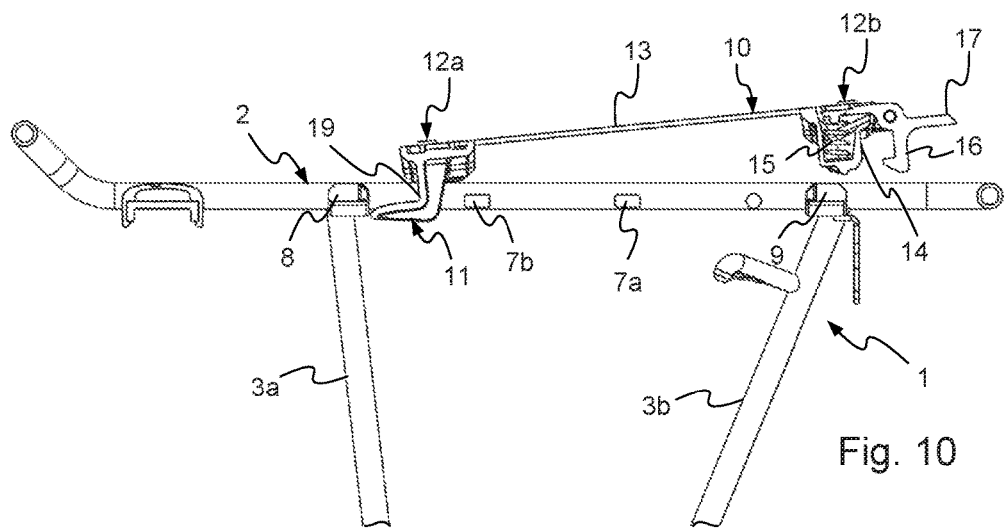
Figure 11:
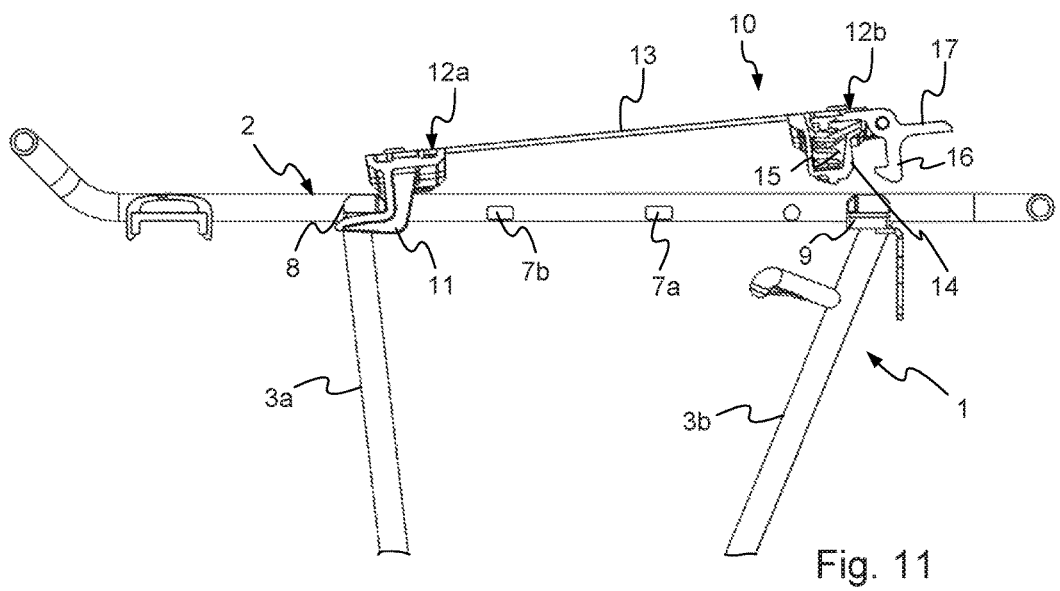
Figure 12:
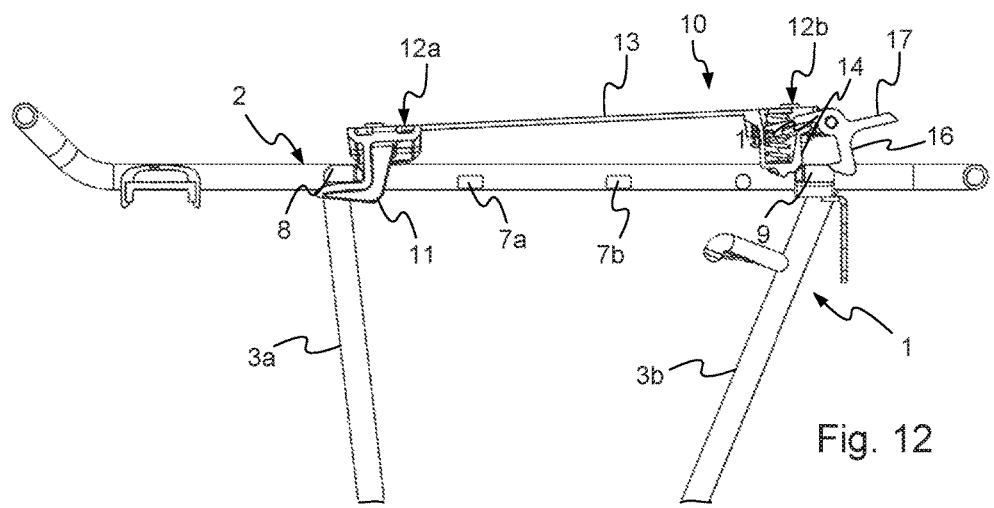

In FIGS. 10-11 the hook shaped portion 11 of the adapter 10 is inserted underneath the first attachment member 8. The surface 19 of the hook shaped portion 11 is brought into contact with the first attachment member 8. The first attachment member 8 may have a shape corresponding to the hook shaped portion 11, such that the two portions 8, 11 interconnect with each other, providing stability to the connection between the luggage carrier 1 and the adapter 10.

Figure 13:
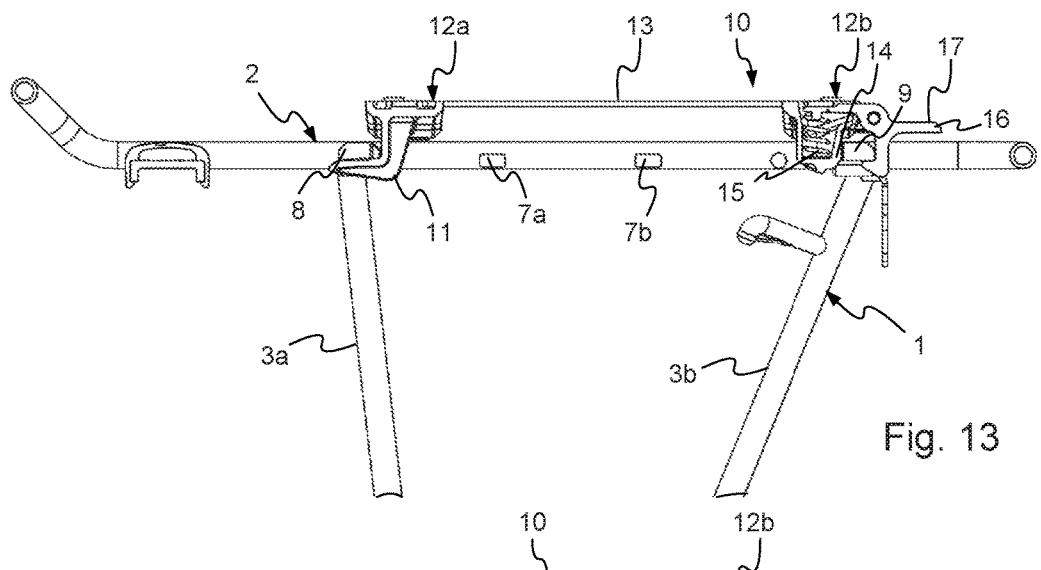

Thereafter, the opposite side of the adapter 10 is brought downwardly. The first attachment member 8 becomes a center of rotation around which the adapter 10 is rotatable. By rotating the second portion 12b downwardly, towards the luggage carrier 1, the latch 16 will come into contact with the second attachment member 9. By pressing the adapter 10 further downwardly, the latch 16 moves outwardly (to the right in FIG. 12) by means of the spring 15 such that it passes the second attachment member 9 and engages around it. The surface 19 together with the counter-hold 14 ensure that the attachment is firm and that the adapter 10 cannot move along the luggage carrier 1. The final position is shown in FIG. 13.

The distance between the surface 19 of the hook shaped portion 11 and the counter-hold 14 is adapted to correspond to the distance between the first and second attachment member 8, 9. Thus, the adapter 10 cannot move in the longitudinal direction of the luggage carrier 1. The adapter 10 is configured to be inserted between the first and second attachment members 8, 9.

Figure 14:
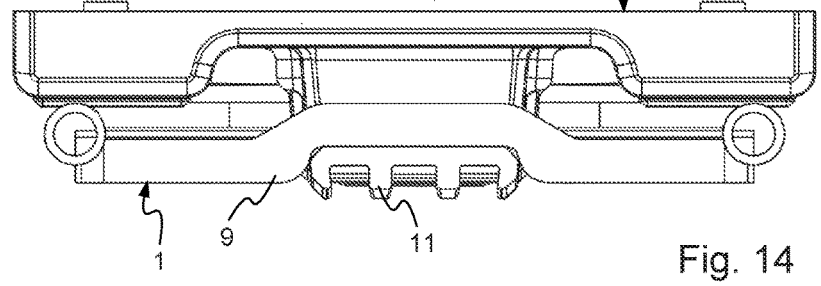
FIG. 14 is a front view of the adapter attached to the luggage carrier.

In one embodiment, the complete luggage carrier 1 is molded in one piece. This provides extra stability to the structure, including the first and second attachment members 8, 9. Since the adapter 10 is configured to be provided between the first and second attachment members 8, 9 the robust one-piece molding also provides additional stability to the attachment of the adapter 10, The one-piece molding provides for a possibility to determine the distance between the first and second attachment members 8, 9 very accurately, such that the adapter 10 fits snugly there between. In FIG. 14 the luggage carrier 1 and the adapter 10 are shown from the front, where the hook shaped portion 11 engages with the correspondingly shaped first attachment member 8. The shape of the first attachment member 8 provides the connection between the luggage carrier 1 and the adapter 10 with stability in a transverse direction. In another embodiment, the adapter may be turned 180° (i.e., secured to the frame 2 in the opposite direction as shown in FIGS. 9-13) such that the view in FIG. 14 is back view.

Thus, the adapter 10 is locked both in the transverse and longitudinal directions of the luggage holder 1. It is securely held in place, and, at the same time, it is easy to mount the adapter to, and dismount the adapter from, the frame. The adapter 10 may be attached to an object 18, such as a bag or a basket, or similar object which then becomes easily attachable to the luggage carrier 1.

In order to release the adapter 10 from the luggage rack 1, the release portion 17 is lifted in an upward direction. Thereby, the latch 16 is released from the second attachment member 9, and the hook shaped portion 11 can be removed from underneath the first attachment member 8. The bag 18 is thereby free to be removed from the luggage carrier 1.

This is an efficient way to attach items to a luggage carrier 1 of a bicycle. The rotating movement of the adapter 10 provides for an easy attachment for the user, even if the attached bag 18 is heavy, since the force of gravity contributes to pull the bag 18 with the adapter 10 downwardly, and into the connected position.

It should be appreciated that the inventive concept is not limited to the embodiments described herein, and many modifications are feasible within the scope of the invention set forth in the appended claims. For example, the adapter 10 may be configured to be attached either with the hook shaped portion 11 in the front, and the latch 16 in the back, or in the opposite direction.

Further, the release portion 17 may be shaped differently, e.g. by a webbing, textile or a wire. The location of the release portion 17 may also be different. It may be side-mounted, such that it is provided alongside the luggage holder 1.

The release portion 17 may further be integrated in the basket provided with the adapter, such that the basket, adapter and release portion becomes one unit. In this case the release portion 17 may be integrated in a handle (not shown) of the basket and by moving the handle e.g. upwardly, the adapter 10 and the basket are released from the luggage holder 1. The release portion 17 could also be pressed downwardly or sideways, be turned, or operated in any other suitable manner in order to release the adapter 10.

Even though the attachment of the adapter 10 to the bag 18 or basket has not been described in detail, this may be done in many different ways. For example, the adapter 10 and the basket may be molded together to form a single unit, the adapter 10 may be bolted or riveted to the bag 18 or sewn into the bag 18.

In one aspect, there is provided a bicycle comprising a luggage carrier 1 comprising a frame 2, a number of struts 3a, 3b, 3c, 3d, 4a, 4b for attachment to the bicycle, and a first attachment member 8 and a second attachment member 9. The attachment members 8, 9 are configured for attachment of an adapter 10. The adapter 10 comprises a hook shaped portion 11 configured to engage with the first attachment member 8 of the luggage carrier 1, a latch 16 configured to engage with the second attachment member 9 of the luggage carrier 1, and a release portion 17 configured to release the latch 16 from the second attachment member 9.

The invention claimed is:

1. An adapter for attaching an object to a luggage carrier comprising a substantially rectangular frame having two long sides and two short sides, a first of the two short sides being a front short side and a second of the two short side being a rear short side, a first attachment member and a second attachment member provided transversally within the frame, substantially parallel with the short sides, said first attachment member being shaped to define a raised portion; wherein the adapter comprises:
   a first end portion and a second end portion arranged parallel and opposite each other, being interconnected by two long sides of a rectangular distance guiding means;
   a hook shaped portion configured to engage with the first attachment member of the luggage carrier, the hook shaped portion being provided at the first end portion of the adapter and being sized to be received in the raised portion of the first attachment member such that the first attachment member and the hook shaped portion are interconnectable whereby the shape of the first attachment member provides a connection between the luggage carrier and the adapter with stability in a transverse direction of the luggage carrier;
   a latch configured to engage with the second attachment member of the luggage carrier, the latch being provided at the second end portion of the adapter, said latch being movable between a first position in which said latch engages the second attachment member to secure the adapter to the carrier and a second position in which the adapter can be removed from the carrier;
   a release portion configured to move the latch from said first position to said second position to release the latch from the second attachment member; and
   at least one counter-hold provided at the second end portion of the adapter, configured to secure the adapter to the luggage carrier by interacting with the latch.

2. The adapter according to claim 1, wherein at least one counter-hold and the latch are configured and operable to sandwich the second attachment member between them when the adapter is secured to the luggage carrier.

3. The adapter according to claim 1, further comprising a surface directed in the opposite direction of the counter-hold and configured as an opposite directed counter-hold.

4. The adapter according to claim 1, wherein the distance between the first end portion and second end portion is adapted to correspond to the distance between the first attachment member and the second attachment member, such that the first and second end portions fit between the first and second attachment members.

5. The adapter according to claim 1, wherein the latch is spring loaded, said larch being normally biased to said first position.

6. A luggage carrier for a bicycle, wherein the luggage carrier comprises a substantially rectangular frame having two long sides and two short sides, a first of the two short sides being a front short side and a second of the two short sides being a rear short side, a number of struts for attachment to the bicycle, a first attachment member and a second attachment member provided transversally within the frame, in parallel with the short sides, wherein the attachment members are configured for attachment of an adapter according to claim 1.

7. A kit for forming a carrier system comprising the luggage carrier of claim 6 and an adapter connectable to the luggage carrier:
   the adapter comprising a hook shaped portion configured to engage with the first attachment member of the luggage carrier; a latch configured to engage with the second attachment member of the luggage carrier; and a release portion configured to release the latch from the second attachment member.

8. A kit for forming a carrier system comprising a luggage carrier and the adapter of claim 1 which is connectable to the luggage carrier:

said luggage carrier comprising a frame, a number of struts for attachment to the bicycle, a first attachment member and a second attachment member; wherein the attachment members are configured for attachment of the adapter.

9. A load carrying object attached to the adapter of claim 1, and connectable to a luggage carrier by means of the adapter, wherein the adapter is attached to the load carrying object by one of the methods: bolting, riveting, sewing, gluing or one piece molding;

said luggage carrier comprising a frame, a number of struts for attachment to the bicycle, a first attachment member and a second attachment member; wherein the attachment members are configured for attachment of the adapter.

10. A load carrying object attached to an adapter, and connectable to the luggage carrier of claim 6 by means of the adapter, wherein the adapter is attached to the load carrying object by one of the methods: bolting, riveting, sewing, gluing or one piece molding;

the adapter comprising a hook shaped portion configured to engage with the first attachment member of the luggage carrier; a latch configured to engage with the second attachment member of the luggage carrier; and a release portion configured to release the latch from the second attachment member.

11. The adapter of claim 1 wherein the first and second attachment members are integral with the frame.

12. The adapter of claim 1 wherein said latch is pivotally movable between said first and second positions.

13. An adapter for attaching an object to a luggage carrier comprising a first attachment member and a second attachment member, wherein the adapter comprises:

a first end portion and a second end portion, said end portions being interconnected by a distance guiding means defining a mounting surface for an object to which the adapter can be mounted, a hook shaped portion provided at the first end portion underneath said mounting surface and configured to engage with the first attachment member of the luggage carrier, said hook shaped portion and said first attachment member being shaped to define an interconnecting fit with each other thereby providing a connection between the luggage carrier and the adapter with stability in a transverse direction of the luggage carrier;

a latch provided at the second end portion underneath said mounting surface and configured to engage with the second attachment member of the luggage carrier; and a release portion provided on the second end portion of the adapter underneath said mounting surface configured to release the latch from the second attachment member.

14. The adapter of claim 13 wherein the guiding means is rectangular.

15. The adapter of claim 13 wherein the latch portion is movable between a first position in which said latch engages the second attachment member to secure the adapter to the luggage carrier and a second position in which the adapter can be removed from the luggage carrier.

16. The adapter of claim 15 wherein said latch portion is spring biased to normally be in said first position.

17. The adapter of claim 13 wherein said latch portion is pivotally movable.

18. The adapter of claim 13 further including—at least one counter-hold provided at the second end portion of the adapter and spaced from the latch; the latch being operable to removably sandwich the second attachment member between them when the adapter is secured to the luggage carrier.

* * * * *